United States Patent
Certon et al.

(10) Patent No.: US 6,877,387 B1
(45) Date of Patent: Apr. 12, 2005

(54) METHOD FOR MEASURING DISPLACEMENT OF A FLUID IN A CONDUIT

(75) Inventors: Dominque Certon, Tours (FR); Cedric Monod, Paris (FR); Didier Pabois, Saint Cheron (FR); Frederic Patat, Saint Cyr-sur-Loire (FR); Jean-Pierre Remenieras, Montlouis (FR)

(73) Assignee: Faure Herman (FR)

( * ) Notice: Subject to any disclaimer, the term of this patent is extended or adjusted under 35 U.S.C. 154(b) by 0 days.

(21) Appl. No.: 09/719,907

(22) PCT Filed: Jul. 6, 1999

(86) PCT No.: PCT/FR99/01627

§ 371 (c)(1),
(2), (4) Date: Aug. 14, 2001

(87) PCT Pub. No.: WO00/03205

PCT Pub. Date: Jan. 20, 2000

(30) Foreign Application Priority Data

Jul. 10, 1998 (FR) .............................. 98 08894

(51) Int. Cl.⁷ ................................ G01F 1/66
(52) U.S. Cl. .................................. 73/861.29
(58) Field of Search ......................... 73/861.27–861.31

(56) References Cited

U.S. PATENT DOCUMENTS

| | | | | | |
|---|---|---|---|---|---|
| 3,738,169 A | * | 6/1973 | Courty | .................... | 73/861.27 |
| 4,221,128 A | * | 9/1980 | Lawson et al. | .......... | 73/861.29 |
| 4,312,238 A | * | 1/1982 | Rey | ........................ | 73/861.28 |
| 4,391,150 A | * | 7/1983 | Rey | ........................ | 73/861.29 |
| 4,442,719 A | * | 4/1984 | Allen et al. | ............... | 73/861.29 |
| 4,475,406 A | * | 10/1984 | Ansaldi et al. | .......... | 73/861.29 |
| 4,557,148 A | * | 12/1985 | Akiyama | ................. | 73/861.28 |
| 5,522,393 A | * | 6/1996 | Phillips et al. | ....... | 73/861.25 X |
| 5,602,343 A | * | 2/1997 | Franklin | .................. | 73/861.29 |
| 5,741,980 A | * | 4/1998 | Hill et al. | ................ | 73/861.04 |
| 5,847,281 A | * | 12/1998 | Kazys et al. | .................. | 73/597 |
| 6,151,558 A | * | 11/2000 | Conant et al. | ....... | 73/861.27 X |

* cited by examiner

*Primary Examiner*—Harshad Patel
(74) *Attorney, Agent, or Firm*—Daniel M. Goldfisher; Clifford Chance US LLP

(57) ABSTRACT

The invention concerns a method for measuring the displacement of a fluid in a conduit, by measuring the transit time of ultrasounds between two transducers (12, 13), in one direction and in the other, characterised in that it consists in: simultaneously exciting (16) both transducers; then simultaneously measuring (17, 18) the signals received on each of the transducers coming from the other transducer. The measured signals can then be digitised and correlated to determine the difference between the transit times. The invention enables to obtain faster and more reliable, measurement of transit times between transducers.

14 Claims, 1 Drawing Sheet

METHOD FOR MEASURING DISPLACEMENT OF A FLUID IN A CONDUIT

This application is a 371 of PCT/FR99/01627 filed on Jul. 06, 1999.

The present invention relates to a device for measuring fluid flow in the liquid or gaseous phase, and more particularly to a device for flow measurement employing ultrasound.

Measurements of flow are used in instantaneous fluid flow metering and measuring applications in the liquid or gaseous phase and, for example, for metering fluids in sales transactions. The useful information supplied by the measurement system can be the instantaneous value of flow rate, a value averaged over time or average flow rate, or a volume counted between two points in time. Instantaneous or average flow rate measurements are more particularly used in production processes where it is necessary to know, control or regulate the flow of one or several fluids participating in the process. Measurements of volume, resulting from integrating flow rate measurements over a given time interval make it possible to perform metering notably employed for tank filling and/or emptying, as well as for sale of fluid volumes between customer and supplier. The volume thus transferred should preferably be sufficiently accurately known to allow it to be used notably for calculating monetary values relating to the transaction.

Additionally, the flow measurement system should advantageously be of a stand-alone type only requiring the provision of a source of electrical energy of the battery or standard AC utility 50 or 60 Hz line supply type.

In the general field of flow measurement and fluid flow measurement in particular, numerous techniques employing ultrasound devices have been proposed. The majority of these systems employ the so-called transit time method. FIG. 1 shows a diagram of a prior art flowmeter, of the single-chord type. First and second ultrasound transducers 1 and 2 are provided at the side of the conduit 3 through which the fluid is flowing in a direction shown by arrow 4. In the example of FIG. 1, the conduit is cylindrical with a circular cross-section and the two transducers are arranged on diametrically opposed generating lines. Additionally, the two transducers are offset along conduit 3. A chord here is the line joining the centers of the transducers 1 and 2. It makes an angle $\theta$ with the main axis of flow, which is the axis of revolution of the conduit in the example of FIG. 1. L indicates the length of the chord and D the inside diameter of the conduit. If the first transducer 1 sends an ultrasound wave, it is detected, after propagation, by the second transducer 2 after a certain time shift $T_{12}$ known as the transit time. If c is the speed of sound in the fluid and V the mean velocity of the fluid along the chord, $T_{12}$ is given by the relation.

$$T_{12} = L/(c+V \cos \theta) \quad (1)$$

By reversing the function of each of the two transducers, the second transducer 2 becoming the sender and the first transducer 1 the receiver, a transit time $T_{21}$, is measured given by:

$$T_{21} = L/(c-V \cos \theta) \quad (2)$$

Combining relations (1) and (2) makes it possible to obtain an expression for the mean velocity along the longitudinal axis of the conduit, by eliminating variable c. In the measurement where the speed of sound in the fluid is not necessarily known very accurately, and as this value depends on the nature, temperature and pressure of this moving medium, this allows us to avoid a source of error. Mean velocity v is now given by:

$$V = L \cdot (T_{21} - T_{12})/(2 \cos \theta \cdot T_{12} T_{21}) \quad (3)$$

The expression for flow rate, Q, is obtained by multiplying mean velocity V calculated from (3) by the true flow cross-section which is $\pi D^2/4$ in the case of a circular cross-section, and, if necessary, taking account of certain correction factors discussed below:

$$Q = \frac{T_{21} - T_{12}}{(T_{12} - T_1)(T_{21} - T_2)} \times \frac{\pi \cdot L \cdot D^2}{8 \cdot \cos} x K_h \quad (4)$$

In this formula, $T_1$ and $T_2$ are respectively the propagation time of the ultrasound wave in the non-flow part of the stream, outside diameter D, for paths from the first transducer to the second, and from the second transducer to the first. $T_1$ and $T_2$ are equal except in the particular case where movement exists in these non-flow regions. These times correspond in particular to the time taken for the ultrasound wave to pass through the various layers of the materials constituting the transducer and the region of coupling between the transducer and the flowing fluid. $K_h$ is the hydraulic coefficient of the ultrasound flowmeter. Its purpose is to correct sampling at the time of measurement. In effect, the principle of transit time difference gives a measurement of mean velocity of flow along the measurement chord linking the transducers. This chord is not necessarily representative of the total flow surface area. This leads to an error in the calculated flow rate which depends on the actual velocity profile inside the cross-section of flow. The purpose of $K_h$ is to correct this error. This coefficient is generally set after laboratory measurements for a certain range of flow rate values.

This type of flowmeter suffers from the following problems. One of the main factors influencing accuracy of an ultrasound flowmeter using the transit time principle is the accuracy with which the various time measurements $T_{12}-T_1$, $T_{21}-T_2$ and $T_{21}-T_{12}$ in formula (4) are obtained. As times $T_{12}$ or $T_{21}$ are of the order of some hundred microseconds, measuring these transit times with an accuracy of the order of $1/1000$ does not present any particular problem. On the other hand, accurate measurement of the difference $T_{12}-T_{21}$ is much more difficult as, for small flow rates, this value can be less than 1 nanosecond. Accuracy of flow measurement is limited by the accuracy of this transit time difference.

Additionally, it is important, in certain flow measurement applications, to have real-time flow measurements available. Such applications typically appear in production processes, where a flow will then be regulated as a function of measurement results and where saving time in measurement can be extremely valuable in order to avoid possible deterioration of quality or loss of production. The flowmeter in FIG. 1 is poorly placed to supply real-time measurements considering that successive measurements of transit time in both directions are necessary.

The invention consequently sets out to resolve the problem of measurement accuracy in flowmeters and specifically that of resolving the problem of measuring flow in real time. A further aim of the invention is to improve the quality and speed of obtaining flow measurements estimated from measured transit times and to thus obtain real-time measurements.

More precisely, the invention provides method for measuring the displacement of a fluid in a conduit, by calculating a difference in ultrasound transit time between two transducers in one direction and in the other, characterised by the steps:

of simultaneously exciting the two transducers, then simultaneously measuring signals received at each one of the transducers originating from the other transducer.

In one embodiment, the step of simultaneous excitation is performed using a single circuit.

A step of synchronously digitizing the signals received at each one of the transducers can be provided.

Calculation of the difference in transit time can comprise interrcorrelating signals received at each one of the transducers and seeking an intercorrelation maximum.

In one embodiment, calculation of the difference in transit time comprises intercorrelating received signals, calculating the Hilbert transform of intercorrelation, and seeking zeros of the Hilbert transform.

In this case, the seeking of zeros is performed by polynomial interpolation of the Hilbert transform, preferably by interpolation using a third degree polynomial.

A calibration step by measuring ultrasound propagation time outside the flowing fluid can be provided.

This calibration step advantageously comprises measurement of transit time between the transducers for two fluids of different and known velocities.

In one embodiment, the method comprises a step of correcting values of ultrasound propagation time outside the flowing fluid, as a function of temperature.

The invention also provides a driver circuit for a device for measuring displacement of the fluid in a conduit, with at least two transducers defining a measurement chord, the circuit comprising:

means for simultaneously exciting two transducers;
means for simultaneously measuring received signals at each one of the transducers originating from the other; and
switching means for successively connecting the excitation means and measurement means to the terminals of the transducers,
as well as means for synchronously digitizing signals received at one of the transducers.

In one embodiment, the switching means comprise a multiplexing circuit.

The measurement means can comprise at least one amplifier and at least one analog/digital converter.

The invention finally provides a device for measuring fluid displacement in a conduit, comprising at least two transducers and the driver circuit as above.

Further characteristics and advantages of the invention will become more clear from the detailed description which follows of some embodiments of the invention provided by way of example with reference to the attached drawings.

Figure 1:
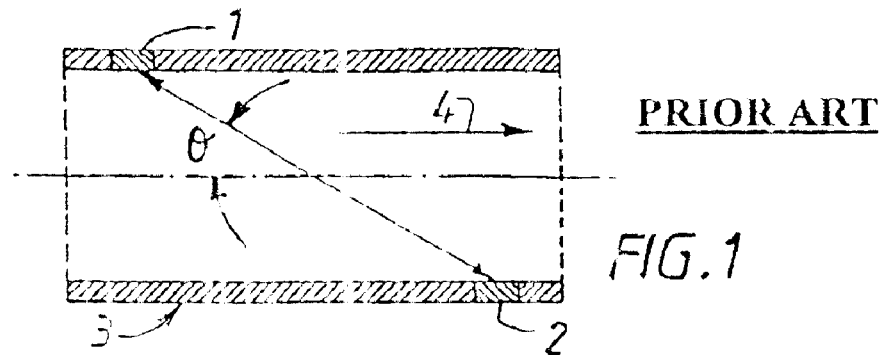
FIG. 1 shows, diagrammatically, a prior art flowmeter of the single chord type.

The invention provides a solution allowing substantial improvement in the measurement accuracy in fluid flow measuring devices, employing the difference in transit time between two transducers as a basis for measurement. It applies to known single-chord or multi-chord measuring devices of the type in FIG. 1, but also to measuring devices of the type shown in FIG. 3 or yet again to the applicant's co-pending patent application entitled "single-chord ultrasound flow meter".

The invention notably applies in measuring devices using similarities between signals representing transit times between transducers.

Using the above notation, a first method for calculating the difference between $T_{21}-T_{12}$ involves seeking the maximum of a correlation function between the two signals received after passage in the direction transducer 1 to transducer 2 and in the direction transducer 2 transducer 1. The maximum of this correlation function of the two signals is obtained through a value giving the difference in transit time. Such calculation of transit time difference is advantageously performed on digital signals as explained below. As the invention ensures the signals have a similar form, calculating correlation of the signals makes it possible to obtain accuracy in transit time measurement which is well below the sampling step.

Another method for calculating the difference $DT=T_{21}-T_{12}$ involves seeking a zero crossing point of the Hilbert transform—represented by $C\tilde{sr}(r)$—of the intercorrelation function between the signals received after travel in the direction transducer 1 to transducer 2 and in the direction of transducer 2 to transducer 1. This other method has the advantage, compared to the preceding one, of reducing measurements skew, in other words the difference between the true value of the time difference and the estimated time, by a factor of 10 for a given signal-to-noise ratio. Again, calculation is advantageously performed on digital signals.

Let us call s(n) and r(n) the sequences of N points digitised at the same time by the converters of the electronic acquisition system, which correspond to the signals received. Seeking the difference DT can then be done in two steps: first, a raw estimation and then, if needs be, refinement of this estimation by interpolation of $C\tilde{sr}(r)$ around its zero. In the first step, the Hilbert transform of intercorrelation is calculated from the two signals r(n) and s(n); rapid seeking of the zero of this function, situated between the maximum and minimum values of the function, is done by calculation, for example by a binary search technique. The Hilbert transform $C\tilde{sr}(r)$ can be calculated by fast Fourier transform (FFT) as will now be explained. We start by calculating R(f) and s(f), the respective Fourier transforms of r(n) and s(n). Next, S(f) is conjugated to obtain the conjugate S*(f), and the conjugate is multiplied by R(f). The product R(f).S*(f) is then multiplied in the frequency domain by j.sign(-f), with $j^2=-1$ and sign(-f) a function equal to +1 for negative frequencies between $-f_e/2$ and 0, and equal to -1 for positive frequencies between 0 and $f_e/2$, fe being the sampling frequency. The Hilbert transform $C\tilde{sr}(r)$ is obtained by applying the inverse Fourier transform to the function j.sign(-f).R(f).S*(f).

A raw estimation of the zero of the Hilbert transform can be obtained, in a time interval limited by the maximum and minimum values of $C\tilde{sr}(r)$, by comparing the signs of two successive points, starting with the maximum or minimum value.

One can then proceed, in a second step, to a more precise search for the zero of the Hilbert transform, proceeding by interpolation, for example by interpolating four points around the previously determined zero, referred to below as $A_i(x_i, y_i)$, i varying from 1 to 4. Advantageously, two points above zero and two points below zero are taken. Interpolation by a third order polynomial passing through the four points gives good results, and is an acceptable compromise between complexity and speed of calculation of the interpolation function. As the interpolation polynomial, we can use the Lagrange interpolation polynomial which is written:

$$g_3(t) = \sum_{i=1}^{4} \left[ y_i \prod_{j \neq i} \frac{(t-x_j)}{(x_i-x_j)} \right]$$

or a normalised version of this polynomial or another interpolation polynomial. The delay DT being sought is the root of this polynomial, i.e. the real value to $t_o$ for which $g(t_o)=0$. The third degree polynomial can have 3 real roots which can be obtained analytically starting from the coefficients of the normalised polynomial and, in this case, from these three solutions only the one comprised between the minimum and maximum of the previously calculated Hilbert transform $C\bar{sr}(r)$ is adopted.

This method makes it possible to obtain an accuracy in measuring the DT well below the sampling increment. For orders of magnitude of signal to noise ratio of the received signal of 50 dB, a standard deviation in time shift measurement of 0.2 nanoseconds can typically be obtained with a 50 ms signal sampling step.

The invention proposes, in order to obtain a correct value of the correlation between the signals, to have the signals received at each transducer as similar as possible. For this, the invention proposes simultaneously exciting the two transducers of one measurement chord and then measuring, at the same time, the signals received at each of the transducers originating from the other transducer. This additionally has the advantage of allowing measurement in as short a time as possible as measurements of transit time between the two transducers of one chord of measurement take place simultaneously.

The invention additionally makes it possible to considerably limit the influence of variations brought about by fluid movement. In prior art systems, fluid flow could vary between successive transit time measurement in one or the other sense; contrary to this, in the invention, the measurements occur completely simultaneously whereby the flow can be considered as practically frozen during the measurement time. In other words, the waves from a transducer 1 to transducer 2 and vice-versa pass through the fluid in the same state of turbulence.

The signals received can then be processed; for this, the invention proposes digitizing the signals received to allow more accurate processing. This process is less costly and makes it possible to avoid problems of drift and control, specific to analog electronics, and allows the necessary calculations to then be performed using a microprocessor incorporated in the flowmeter system. As the range of the ultrasound frequencies employed for flowmeters is comprised between several hundreds of kHz and several MHz, a sampling time of 50 ns to 500 ns is suitable for providing a full description of the signals received.

Figure 2:
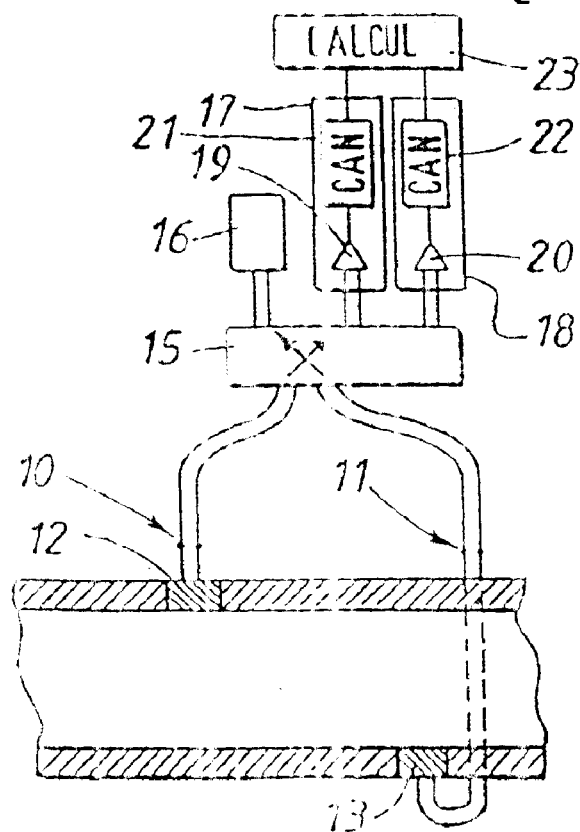
FIG. 2 is a block diagram of the driver circuit according to the invention, for a device for ultrasound measurements of displacement of a fluid.

FIG. 2 is a schematic diagram of a driver circuit according to the invention, for an ultrasound fluid displacement measuring device; the circuit in FIG. 2 corresponds to the simplest case of a measuring device only comprising a single chord, i.e. two transducers. Terminals 10 and 11 in the circuit are intended to be connected to the transducers 12, 13; these terminals are connected to switching means 15, in the example of FIG. 2, a multiplexing circuit.

Additionally, the multiplexing circuit 15 is connected to the means for simultaneously exciting the two transducers; these means comprise a single sending circuit 16 designed to simultaneously excite the two transducers when the switching means connect the sending circuit to the terminals of the transducers. The switching means allow the sending circuit to drive the two transducers in parallel thereby guaranteeing that the exciting waveforms seen by each transducer are simultaneous and identical. The circuit is also connected to the means for simultaneously measuring the signals received at each of the transducers; in the embodiment, these measuring means comprise two measurement channels 17, 18, each of the measurement channels being intended for one of the transducers. Each measurement channel comprises an amplifier 19, 20 the output of which is connected to an analog/digital converter 21, 22. Preamplifiers 19, 20 are made to be as identical as possible as regards choice and matching of components, circuit layout and electronic settings, so as not to cause any delay or deformation of the signals received. The output from each analog/digital converter is connected to a computing circuit 23, for example taking the form of a microprocessor.

The circuit in FIG. 2 thus makes it possible, when the switching means connect the exciting means and the transducers, to simultaneously and identically excite the transducers. After exciting the transducers, the switching means connect the transducers to the measuring means, in order to simultaneously measure the signals received at each transducer originating from the other transducer. The principle of reciprocity applicable to transducers of the piezoelectric type ensures that the signals gathered at each transducer are similar, so that the signals received only differ by their transit time.

Figures 3, 4:
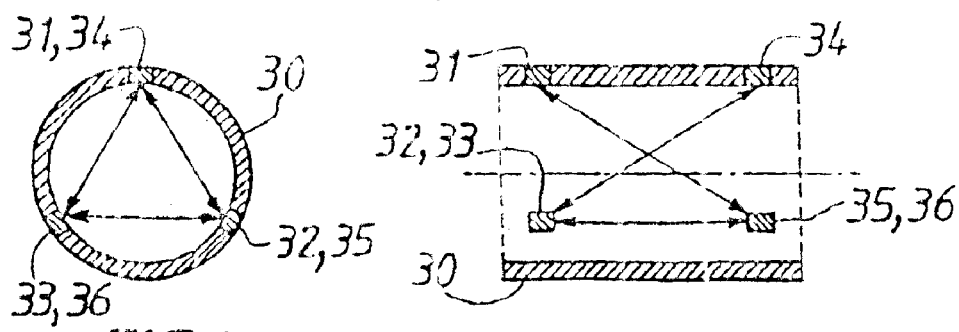
FIGS. 3 and 4 are a longitudinal cross section and a transverse cross section of a measuring device in an ultrasound flowmeter to which the driver circuit of the invention can be applied.

The invention does not only apply to devices of the type in FIG. 1, but more generally to all types of measuring devices that include transducers, in which a difference in transit time is measured between pairs of transducers in one direction of transit and the other. Possible transducer configurations are notably described in the applicant's French patent application referred to above. FIGS. 3 and 4 are respectively a longitudinal and transverse cross section of a measurement device disclosed in that patent application, and to which the invention can be applied. The device in these figures comprises six transducers, 31–36, forming two groups each of three transducers, spaced along conduit 30. The transducers of each transducer group are regularly distributed over the periphery of the conduit. The transducers of one group has a directivity diagram covering at least two transducers of the other group. Thus, the directivity diagram of transducer 31 of the first group covers transducers 35 and 36 of the second group, i.e. the set of transducers of the second group except for transducer 34 which lies on the same generating line. The device of FIGS. 3 and 4 makes it possible to generate, using six transducers, six measurement chords.

For the device of FIGS. 3 and 4, a circuit is provided having means for simultaneously and identically-exciting two transducers, and means for simultaneously measuring the signals received at two transducers; the circuit additionally comprises switching means for successively connecting the exciting means and the measuring means to any terminals of the two transducers selected from the six transducers of the device.

Measurement can for example be done in the following way:

simultaneous measurement of $T_{16}$ and $T_{61}$, by connecting transducers 31 and 36 to the exciting means and then the measurement means;

simultaneous measurement of $T_{15}$ and $T_{51}$, by connecting transducers 31 and 35 to the exciting means and then the measurement means;

simultaneous measurement of $T_{24}$ and $T_{42}$, by connecting transducers 32 and 34 to the exciting means and then the measurement means;

simultaneous measurement of $T_{26}$ and $T_{62}$, by connecting transducers 32 and 36 to the exciting means and then the measurement means;

simultaneous measurement of $T_{34}$ and $T_{43}$, by connecting transducers 33 and 34 to the exciting is means and then the measurement means;

simultaneous measurement of $T_{35\ and\ T53}$, by connecting transducers 33 and 35 to the exciting means and then the measurement means;

where $T_{ij}$ is measurement of the transit time between the transducers 3$i$ and 3$j$, with $1 \leq i,j \leq 6$.

One can thus calculate, in a minimum of time, the values of velocity or flow on the six chords; averaging these values gives a measurement of the velocity or flow which is achieved more rapidly, more accurately and more reliably than with known devices.

Thus, the invention applies to any ultrasound flowmeter device having a plurality of transducers fixed at selected positions on the wall of a conduit through which the fluid the flow of which it is desired to measure is flowing. The conduit can be a conduit of any type, size and material employed in practice. The transducers can be fixed to the wall by conventional means, known per se. The invention further proposes calibrating the propagation times of the ultrasound outside the flowing fluid, as indicated below. In the framework of conventional setups for flow measurement using transit times, the times T1 and T2 are identical since the two waves follow the same paths in opposite directions. Measurement of (T1+T2)/2 can be done by successively filling the measurement sleeve fitted with the transducers with two pure liquids at a controlled temperature, of different velocities that are known very accurately; one can for example use water and ethyl alcohol. Transit time is measured for each pair of transducers in each medium. This leads to the obtaining of a linear system of two equations with the two unknowns, T1+T2 and L; resolution of the system makes it possible to store accurate values of T1 and L in memory for use of formula (4) in an operational situation.

The invention further proposes, if it proves that these values may vary significantly with temperature for the measurement result, to correct these values as a function of temperature. For this, a temperature probe is provided in the measurement device, and the values of transit time are corrected as a function of temperature. Clearly, in this case, the temperature sensor can be placed at various positions in the measurement device or close to it, so as to measure fluid temperature.

The device of the present invention was designed to meet the requirements determined by potential conditions of use of the equipment regardless of the medium and intended purpose (flow rate measurement, metering) envisaged. In particular, it provides repeatability of measurement of stable flow and exactness of measurement with respect to international standards. Similarly, it has very low sensitivity to dynamic conditions of the flow (hydraulic conditions upstream of the measurement system, changes in Reynolds number . . . ) as well as vis-a-vis thermodynamic parameters of the fluid and the environment outside the equipment (pressure, temperature, humidity, . . . ). The ultrasound system described in this invention consequently makes it possible, when compared to devices of the prior art, to measure fluid flow with improved accuracy, with low responsiveness to random fluctuations in the velocity due to turbulence, and improved speed of measurement. The device according to the invention makes it possible, by reducing the number of transducers and introducing digital electronics, to limit the cost of the system, together with the cost of maintenance and re-calibration.

This present invention is obviously not limited to the embodiments just described and illustrated; one could also use analog circuits or other means of switching apart from a multiplexing circuit.

What is claimed is:

1. A method for measuring the displacement of a fluid in a conduit, having two transducers offset along a main axis of the conduit, the method comprising the steps of:
   simultaneously exciting the two transducers using a single exciting circuit,
   simultaneously measuring signals received at each one of the transducers originating from the other transducer,
   synchronously digitizing the signals received at each one of both transducers, and
   calculating a difference in ultrasound transit time between the two transducers in one direction and in the other.

2. The method according to claim 1, wherein the step of calculating comprises interrcorrelating signals received at each one of the transducers and seeking an intercorrelation maximum.

3. The method according to claim 1, wherein the step of calculating comprises intercorrelating received signals, calculating the Hilbert transform of intercorrelation, and seeking zeros of the Hilbert transform.

4. The method according to claim 3, wherein the seeking of zeros is performed by polynomial interpolation of the Hilbert transform, preferably by interpolation using a third degree polynomial.

5. The method according to claim 1, further comprising a step of calibrating by measuring ultrasound propagation time outside the flowing fluid.

6. The method according to claim 5, wherein the step of calibrating comprises successive measurement of transit time between the transducers for two fluids of different and known velocities.

7. The method according to claim 1, further comprising a step of correcting values of ultrasound propagation time outside the flowing fluid, as a function of temperature.

8. A method for measuring the displacement of a fluid in a conduit, having two transducers offset along a main axis of the conduit, the method comprising the steps of:
   simultaneously exciting the two transducers,
   simultaneously measuring signals received at each one of the transducers originating from the other transducer,
   synchronously digitizing the signals received at each one of both transducers, and
   calculating a difference in ultrasound transit time between the two transducers in one direction and in the other, by intercorrelating received signals, calculating the Hilbert transform of intercorrelated signals, and seeking zeros of the Hilbert transform.

9. The method according to claim 8, wherein the step of simultaneously exciting uses a single exciting circuit.

10. The method according to claim 8, wherein the seeking of zeros is performed by polynomial interpolation of the Hilbert transform, preferably by interpolation using a third degree polynomial.

11. The method according to claim 9, wherein the seeing of zeros is performed by polynomial interpolation of the Hilbert transform, preferably by interpolation using a third degree polynomial.

12. The method according to claim 8, further comprising a step of calibrating by measuring ultrasound propagation time outside the flowing fluid.

13. The method according to claim 12, wherein the step of calibrating comprises successive measurement of transit time between the transducers for two fluids of different and known velocities.

14. The method according to claim 8, further comprising a step of correcting values of ultrasound propagation time outside the flowing fluid, as a function of temperature.

* * * * *